Figure 1:
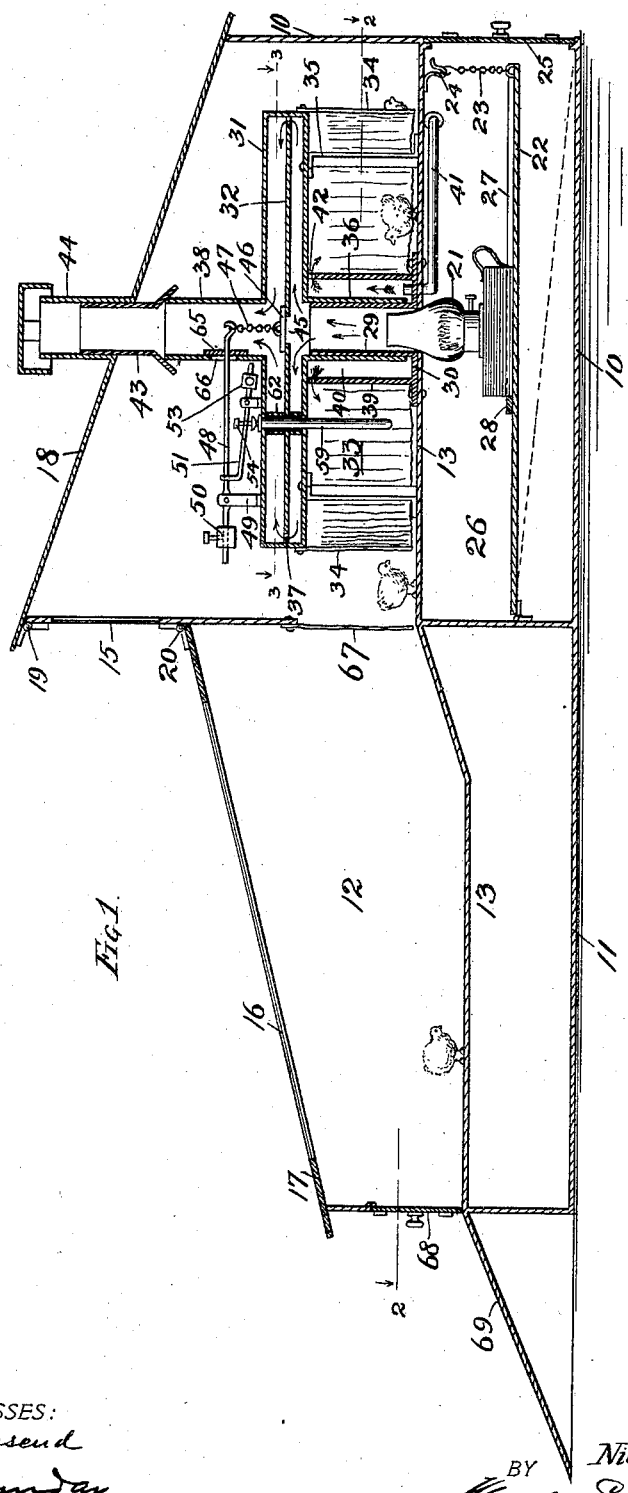

No. 709,508. Patented Sept. 23, 1902.
N. PEDERSEN.
CHICKEN BROODER.
Application filed Sept. 9, 1901.
(No Model.) 3 Sheets—Sheet 1.

WITNESSES:
F. B. Townsend
INVENTOR.
Niels Pedersen
BY
ATTORNEYS

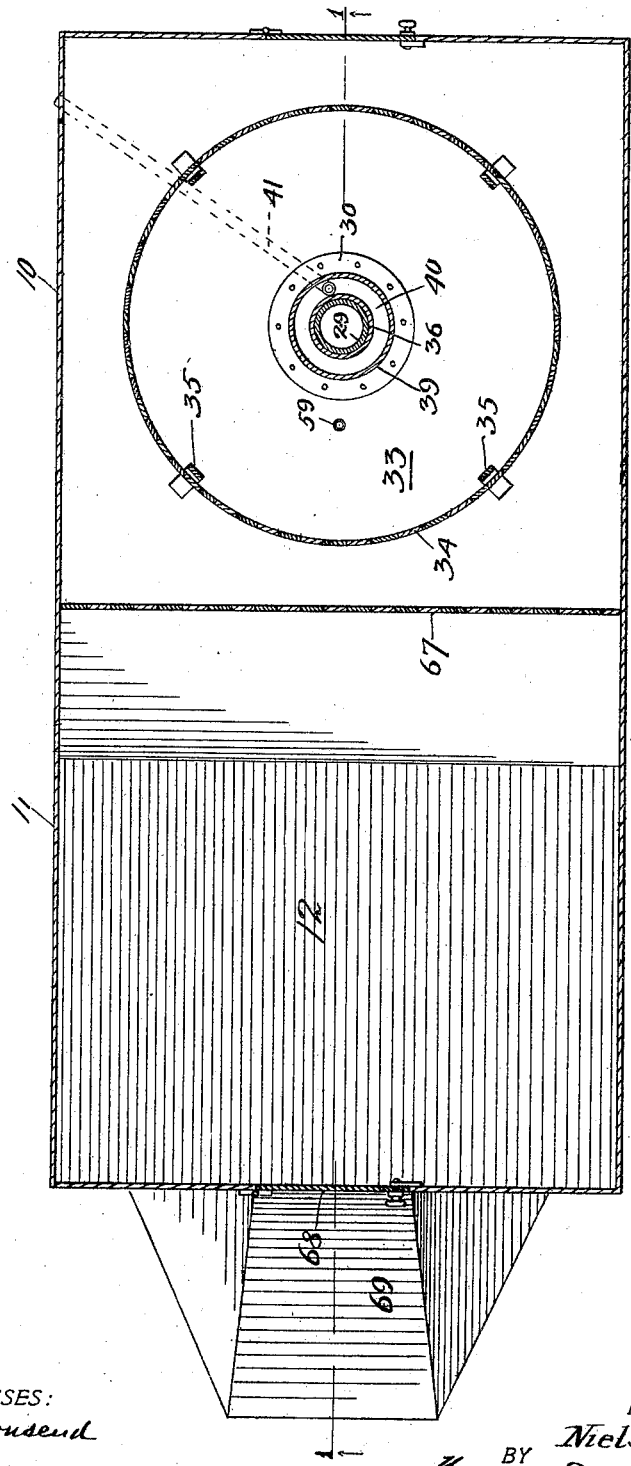

No. 709,508. Patented Sept. 23, 1902.
N. PEDERSEN.
CHICKEN BROODER.
(Application filed Sept. 9, 1901.)
(No Model.) 3 Sheets—Sheet 3.
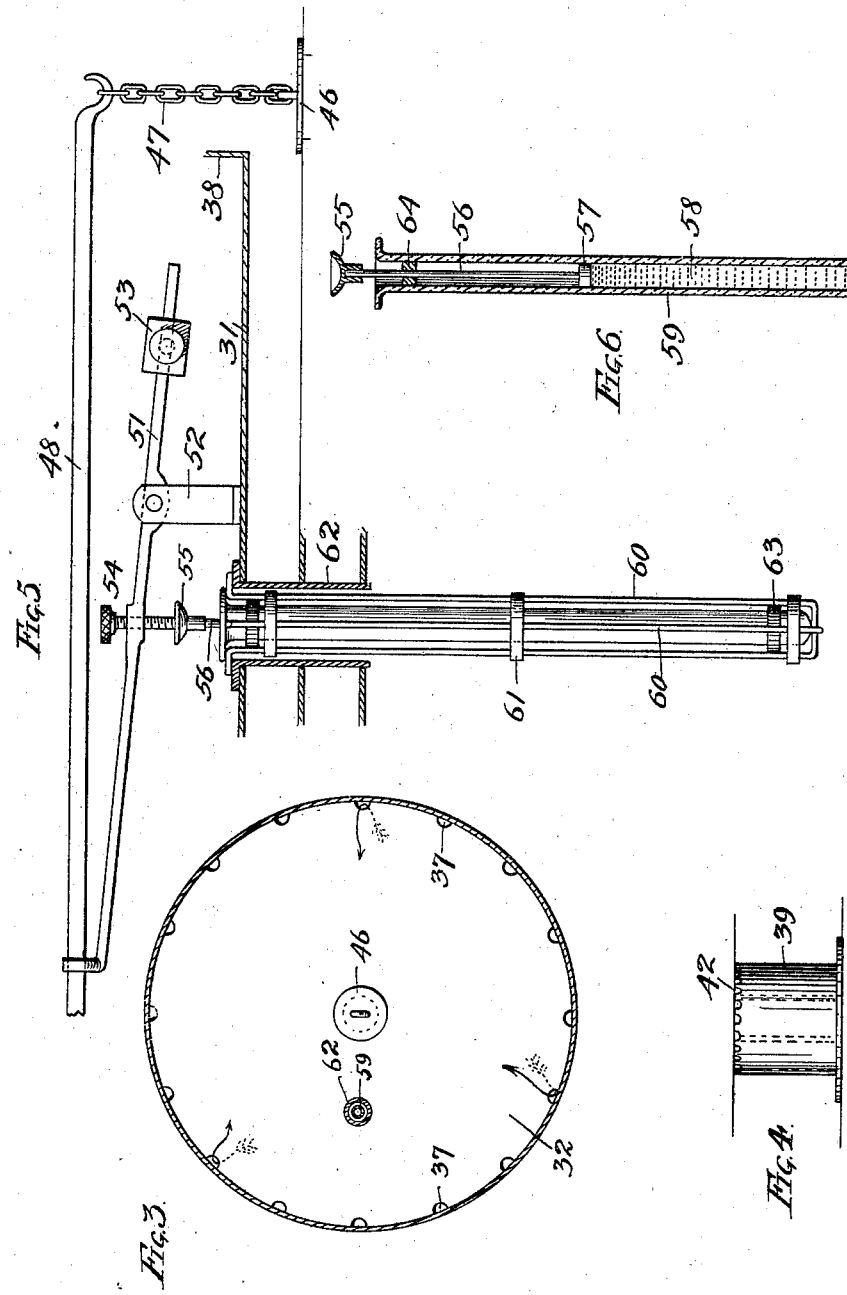
WITNESSES: INVENTOR.
Niels Pedersen
BY
ATTORNEYS

UNITED STATES PATENT OFFICE.

NIELS PEDERSEN, OF JOLIET, ILLINOIS, ASSIGNOR TO HIMSELF AND FREDERICK C. WILCOX, OF JOLIET, ILLINOIS.

CHICKEN-BROODER.

SPECIFICATION forming part of Letters Patent No. 709,508, dated September 23, 1902.

Application filed September 9, 1901. Serial No. 74,728. (No model.)

*To all whom it may concern:*

Be it known that I, NIELS PEDERSEN, a citizen of the United States, residing in Joliet, in the county of Will and State of Illinois, have invented a new and useful Improvement in Chicken-Brooders, of which the following is a specification.

This invention relates to improvements in brooding-houses for raising chickens; and its objects are to obtain a more perfect regulation of the heat than has heretofore been possible and also to more thoroughly protect the chicks from the gases and odor given off by the heating-lamp.

The nature of the invention is fully set forth below and illustrated in the accompanying drawings, in which latter—

Figure 1 is a vertical section of the invention. Figs. 2 and 3 are sections on the lines 2 2 and 3 3, respectively, of Fig. 1. Figs. 4, 5, and 6 are detail views.

In said drawings, 10 represents the main house of the brooder, in which are located the heating device and the chamber heated thereby, and 11 is the usual annex to said main part, containing the inclosed but unheated chamber 12. Both the main part and the annex have false floors 13, so that the rooms inhabited by the chicks may be kept perfectly dry. The main house is lighted by a side window 15 and the annex by the glass 16 in its top 17. The tops 17 and 18 are both hinged, as at 19 and 20.

The heating-lamp 21 is located in an apartment below the floor 13 of the main part 10 and is supported upon a platform 22, hinged at its back end and supported in front by the chain 23 and hook 24, attached to the floor 13, and a door closes the front of the lamp-apartment, which is designated as 26. The platform may have guide-strips 27 at each side of the lamp and a stop 28, against which it is moved in positioning it. In order to remove the lamp, the platform is released from hook 24 and lowered, and thereby the lamp-chimney is brought below the floor 13, so that it can then be taken out for refilling or lighting.

In the main house is located the warm chamber or brooding-room 33, formed between the floor 13 and the overhead heater 31 by a curtain 34, depending from the heater into close proximity to the floor. The heater is supported on legs 35, is provided with an internal diaphragm or horizontal partition 32, and receives the heated currents from the lamp through a vertical pipe 29, secured to the floor 13 by means of its flange 30. The heater is preferably provided with a downwardly-extending pipe 36, setting over pipe 29 and effecting a tight joint therewith, adapted to prevent the gases and smell from the lamp from entering chamber 33. The diaphragm 32 is cut away at several points around its margin, as at 37, so that the heat-currents will pass first from pipe 29 horizontally under the diaphragm to the periphery of heater 31 and then horizontally back and over the diaphragm to the center, where it enters the escape-flue 38. The chicks are prevented from getting against the pipes 36 or 29, which are apt to be hot, by surrounding them with a thimble 39, large enough to form a warm-air passage 40 all around the pipes, and this passage is supplied with fresh outside air through the pipe 41 and admits it to the brooding-room 33 through the openings 42, formed in the top of the thimble and below heater 31. This passage has no communication with the pipe 29, and consequently the air supplied by it to the brooding-room is uncontaminated by gases or odor from the lamp. The brooding-room is heated by my construction by the warm fresh air entering from passage 40 and by heat radiated from the overhead heater. At the same time the floor 13 is kept moderately warm by the heat given off below the floor 13 by the lamp. A flanged pipe-section 43 may connect the flue 38 with the stationary outlet 44, secured in the hinged top 18, and it is preferably telescoped in outlet 44. Inasmuch as the cover 18 is hinged and may be required to be opened frequently, the utility of the flanged bottom of pipe 43 is apparent, as it automatically seats itself upon the stationary section 38 and effects a tight joint therewith. The partition of the overhead heater is provided with a central opening 45 directly over pipe 29 and normally closed by a valve 46. When closed, the valve compels the heat-currents from the lamp to take the course indicated by the arrows in Fig. 1; but in case the heat becomes greater than is desired this valve is automatically opened and gives the heat-currents direct access to the outlet 38, so that the temperature in the brooding-chamber will fall to the proper temperature. The means employed for automatically opening and closing this valve will now be described. The valve is attached by a chain 47 to one end of a lever 48, hinged between its ends to an upright 49 and carrying on its other end a weight 50, balancing the weight of the valve and chain. At 51 is another lever pivoted between its ends to an upright 52 and attached at one end to lever 48 between upright 49 and the chain. On the end of lever 51 beyond its pivot is a balancing-weight 53, and at 54 is a set-screw inserted in lever 51, bearing on the dished top of a button 55 on the upper end of a stem 56, carrying at its lower end a piston 57, bearing on the column of mercury 58 in a tube 59. This mercury-tube is inclosed in a cage composed of wires 60 and bands 61 and is supported at its upper end on the overhead heater, and its lower end extends into the brooding-chamber, as shown. A thimble 62 surrounds that portion of the tube which comes within the heater, as seen at Fig. 5, and thus prevents the heat-currents from direct contact with the tube. Hard-rubber collars 63 preferably surround the tube to prevent movement in the cage and to insulate it from the cage. A guide 64 for the stem may be inserted in the tube, as shown.

With the construction described the operation is as follows: The mercury rises and falls with the changes of temperature in the brooding-chamber, and when it rises beyond the normal temperature it exerts a direct lifting power on the piston 57, moving it upward. Through the connections described lever 51 will also be lifted, and the latter in turn lifts lever 48 and causes the opening of valve 46. When the temperature again falls to the normal, the mercury condenses and allows the piston to move down, so that the valve and levers will then resume their normal positions, (indicated in the drawings,) the valve slightly outweighing the counterbalancing parts, and thus causing this movement.

A slide 65 may be placed on the lever 48 adjacent to the slot 66 in the side of flue 38, in which the lever works, and prevent any escape of the gases at that point into the house 10. A curtain 67 is preferably placed at the opening between the house 10 and the annex to prevent the entrance of too much cold from the latter. When the weather permits, the door 68 may be opened and the chicks allowed to pass out by the incline 69.

It will be noted that the cold air from pipe 41 enters passage 40 at the bottom and only escapes into the brooding-chamber after it has risen to the top of the passage. During this time it is tempered and enters the chamber at a temperature but little lower than that prevailing therein.

I claim—

1. The brooder provided with an overhead heater having a single outlet for the gases, &c., from the lamp, and also having both a direct and an indirect passage from the lamp to said flue, together with means for automatically determining which of said passages said gases shall take, substantially as specified.

2. The brooder provided with an overhead heater having a single outlet for gases, &c., from the lamp, and also having both a direct and an indirect passage from the lamp to said outlet, together with means for closing the direct passage automatically whenever the temperature falls too low in the brooding-chamber, substantially as specified.

3. In a brooder, a movable top 18 through which the chimney extends and carrying the loose pipe-section 43 flanged outwardly at its bottom, in combination with a stationary chimney-section 38 with which the pipe-section 43 effects a junction when the cover is closed, substantially as specified.

4. In a brooder, a movable top 18 carrying the chimney-top 44 and a telescoping pipe-section 43 having its bottom flanged outwardly, in combination with a stationary chimney-section 38, substantially as specified.

NIELS PEDERSEN.

Witnesses:
FRED BENNITT,
C. W. BROWN.